(12) United States Patent
Naritomi et al.

(10) Patent No.: US 6,607,685 B2
(45) Date of Patent: Aug. 19, 2003

(54) METHOD OF PRODUCING PIERCEABLE STOPPER

(75) Inventors: Masanori Naritomi, Urayasu (JP); Masao Shiraishi, Matsudo (JP)

(73) Assignee: Taisei Plas Co., Ltd., Tokyo (JP)

( * ) Notice: Subject to any disclaimer, the term of this patent is extended or adjusted under 35 U.S.C. 154(b) by 0 days.

(21) Appl. No.: 09/859,475

(22) Filed: May 18, 2001

(65) Prior Publication Data

US 2002/0029022 A1 Mar. 7, 2002

Related U.S. Application Data

(62) Division of application No. 09/430,171, filed on Oct. 29, 1999, now abandoned.

(30) Foreign Application Priority Data

Nov. 4, 1998 (JP) .............................. 10-313654

(51) Int. Cl.⁷ ....................... B29C 45/14; B29C 70/78; B29C 70/80
(52) U.S. Cl. ................... 264/250; 264/255; 264/266; 264/268
(58) Field of Search ................ 264/250, 254, 264/255, 267, 268, 271.1, 275, 278, 328.7, 328.8, 266

(56) References Cited

U.S. PATENT DOCUMENTS

| | | | | |
|---|---|---|---|---|
| 2,393,578 A | * | 1/1946 | Waite ..................... | 15/248.1 |
| 2,777,411 A | * | 1/1957 | Geisler .................. | 264/157 |
| 2,841,863 A | * | 7/1958 | Geisler ................. | 215/DIG. 3 |
| 3,092,278 A | * | 6/1963 | Jarnhall ................ | 215/247 |
| 4,254,884 A | * | 3/1981 | Maruyama .............. | 215/232 |
| 4,412,573 A |   | 11/1983 | Zdeb | |
| 4,512,486 A | * | 4/1985 | Kobayashi et al. ...... | 215/249 |
| 4,803,031 A | * | 2/1989 | Ochs et al. ............ | 264/255 |
| 5,078,941 A | * | 1/1992 | Tatsumi et al. ......... | 264/161 |
| 5,230,149 A | * | 7/1993 | Martin .................. | 264/139 |
| 5,484,566 A | * | 1/1996 | Gabbard ................ | 264/250 |
| 5,961,911 A | * | 10/1999 | Hwang et al. .......... | 264/268 |
| 6,071,454 A | * | 6/2000 | Shimizu et al. ........ | 264/250 |
| 6,165,402 A | * | 12/2000 | Gabbard et al. ........ | 264/255 |
| 6,322,739 B1 | * | 11/2001 | Andersson et al. ..... | 264/250 |

FOREIGN PATENT DOCUMENTS

| | | |
|---|---|---|
| EP | 0719566 A2 | 7/1996 |
| EP | 0 744 351 A | 11/1996 |
| FR | 1325077 A | 7/1963 |
| FR | 2 618 683 A | 2/1989 |
| JP | 61-13746 | 1/1986 |
| JP | 61-37242 | 2/1986 |
| JP | 61-131746 | 6/1986 |
| JP | 61-247460 | 11/1986 |
| JP | 02-001275 A | 1/1990 |
| JP | 2-147131 | 12/1990 |
| JP | 03-169538 A | 7/1991 |
| JP | 03-205141a | 9/1991 |
| JP | 06-335514 A | 12/1994 |
| JP | 07-308389 A | 11/1995 |
| JP | 8-2367 | 1/1996 |
| JP | 08-317961 A | 12/1996 |
| JP | 09-173417 A | 7/1997 |
| WO | WO 98 36986 A | 8/1998 |

* cited by examiner

*Primary Examiner*—Angela Ortiz
(74) *Attorney, Agent, or Firm*—Armstrong, Westerman & Hattori, LLP.

(57) ABSTRACT

A pierceable stopper for a liquid container, which has a pierceable part made of a thermoplastic synthetic resin elastic material. The pierceable part is formed so as to prevent leakage of liquid from the container when it is pierced with a hollow needle. The pierceable part is confined in a compressed state in the stopper body of the pierceable stopper. A molten thermoplastic synthetic resin elastic material is injected into an injection mold at an injection pressure higher than the normal injection pressure to mold the pierceable part.

4 Claims, 1 Drawing Sheet

METHOD OF PRODUCING PIERCEABLE STOPPER

This application is a continuation of prior application Ser. No. 09/430,171 filed Oct. 29, 1999 now abandoned.

BACKGROUND OF THE INVENTION

The present invention relates to a pierceable stopper used for a liquid container into which a hollow needle can be externally inserted through the pierceable stopper, and also relates to a method of producing the pierceable stopper. More particularly, the present invention relates to a pierceable stopper for a medical liquid bottle or bag filled with a liquid for medical treatment. The pierceable stopper has a pierceable part made of a thermoplastic synthetic resin elastic material and pierceable with a hollow needle for injection or intravenous drip infusion. The present invention also relates to a method of producing the above-described pierceable stopper.

Capsules filled with medical liquids for injection and bottles or bags filled with medical liquids for intravenous drip infusion are preferably designed so that the medical liquids therein can be taken out or a liquid can be injected thereinto without removing the caps or stoppers therefrom. Therefore, the caps and stoppers are arranged so that even when they are pierced with a hollow needle for injection or intravenous drip infusion, the liquids in the containers will not spill out, and, at the same time, foreign matter, e.g. air, in a hospital will not enter the containers. Such stoppers are desirably mass-produced and reduced in cost so as to be used by an increased number of people.

In this case, it is necessary to produce a stopper using a material that will not be torn when pierced with a hollow needle and will not produce even a small gap between the needle and the stopper. At present, vulcanized rubber is used as a material for such a stopper. However, the stopper using vulcanized rubber involves such a danger that an additive, a polymerization solvent, etc. in the vulcanized rubber may flow out into the medical liquid in the container, or rubber chippings may get mixed in the medical liquid. Accordingly, a stopper using a thermoplastic synthetic resin elastic material (hereinafter occasionally referred to as "elastomer") has been proposed [see Japanese Patent Application Unexamined Publication (KOKAI) Nos. 61-247460, 61-37242 and 61-131746 (1986)].

There has also been proposed a stopper comprising two layers of the thermoplastic synthetic resin elastomer [see Japanese Patent Application Post-Exam Publication No. 8-2367 (1996)]. However, an experiment carried out by the present applicant reveals that all the proposed stoppers compensate for the disadvantage of vulcanized rubber but are not sufficiently effective in preventing leakage of the medical liquid after the removal of the inserted needle, and none of them are on the practical level.

SUMMARY OF THE INVENTION

In view of the above-described problems, an object of the present invention is to provide a pierceable stopper capable of preventing leakage of a liquid from a container after the removal of an inserted needle even if a pierceable part of the pierceable stopper is formed by using a thermoplastic synthetic resin elastic material inferior in elastic recovery force to rubber. Another object of the present invention is to provide a method of producing the above-described pierceable stopper.

Another object of the present invention is to provide a pierceable stopper that can be produced at a reduced cost, and to provide a method of producing the pierceable stopper.

To attain the above-described objects, the present invention provides a pierceable stopper having a pierceable part pierceable with a hollow needle and made of a thermoplastic synthetic resin elastic material, and a stopper body having a higher rigidity than that of the material of the pierceable part. The stopper body has an outer peripheral portion for preventing a stress from propagating to the outside when the pierceable part is pierced with the hollow needle and for defining the pierceable part.

From the viewpoint of minimizing the resistance to penetration of the needle, the lower the hardness of the pierceable part, the better. From the viewpoint of ensuring the mechanical strength as well, however, it is practically desirable to use a thermoplastic synthetic resin elastic material having a hardness in the range of from 20 to 80 in terms of JIS(A) hardness. It is more desirable to use a thermoplastic synthetic resin elastic material having a hardness in the range of from 45 to 65 in terms of JIS(A) hardness.

More specifically, one or more thermoplastic synthetic resin elastic materials are optionally selected from among nylon, polyurethane, olefin, polyester and styrene elastomers having a JIS(A) harness of 20 to 80 degrees and used alone or in the form of a composite or mixed elastomer.

From the viewpoint of elastic recovery force, it is desirable for the pierceable part to be made of at least one selected from styrene and olefin elastomers. From the viewpoint of preventing leakage of liquid, it is preferable that the stopper body be made of a thermoplastic synthetic resin material and thermowelded to the pierceable part.

Regarding the thickness of the pierceable part, a thickness of approximately 1 to 10 millimeters is sufficient to prevent leakage of liquid. However, it is desirable for the pierceable part to have a thickness of approximately 2 millimeters or more with a view to practically eliminating the likelihood of liquid leakage. From the viewpoint of minimizing the resistance to penetration of the needle, a thickness of approximately 8 millimeters or less is preferable. Accordingly, in view of both the liquid leakage and the resistance to penetration, it is desirable for the pierceable part to have a thickness of approximately 2 to 8 millimeters.

The pierceable stopper made of the above-described materials and having the above-described structure is preferably produced by a method as stated below.

According to a pierceable stopper producing method of the present invention, after the stopper body has been injection-molded in an injection mold, a melt of the above-described thermoplastic synthetic resin elastic material is injected into a cavity defined by the injection mold and the stopper body to mold the pierceable part.

According to another pierceable stopper producing method of the present invention, after the pierceable part has been injection-molded in an injection mold, a melt of a thermoplastic synthetic resin material is injected into a cavity defined by the injection mold and the pierceable part to mold the stopper body.

Preferably, the injection pressure of the melt of the thermoplastic synthetic resin material or the thermoplastic synthetic resin elastic material is not lower than 500 kg/cm$^2$. With a view to minimizing the leakage of liquid, an injection pressure not lower than 800 kg/cm$^2$ is even more desirable.

From the viewpoint of minimizing the leakage of liquid, it is preferable that the stopper body be made of a thermoplastic synthetic resin material, and that the stopper body and the pierceable part be thermowelded together in the injection mold by the melt heat of the thermoplastic synthetic resin material or the thermoplastic synthetic resin elastic material.

The above and other objects, features and advantages of the present invention will become more apparent from the following description of the preferred embodiments thereof, taken in conjunction with the accompanying drawings.

DESCRIPTION OF THE PREFERRED EMBODIMENTS

The present invention will be described below in detail with reference to the accompanying drawings.

Figure 1:
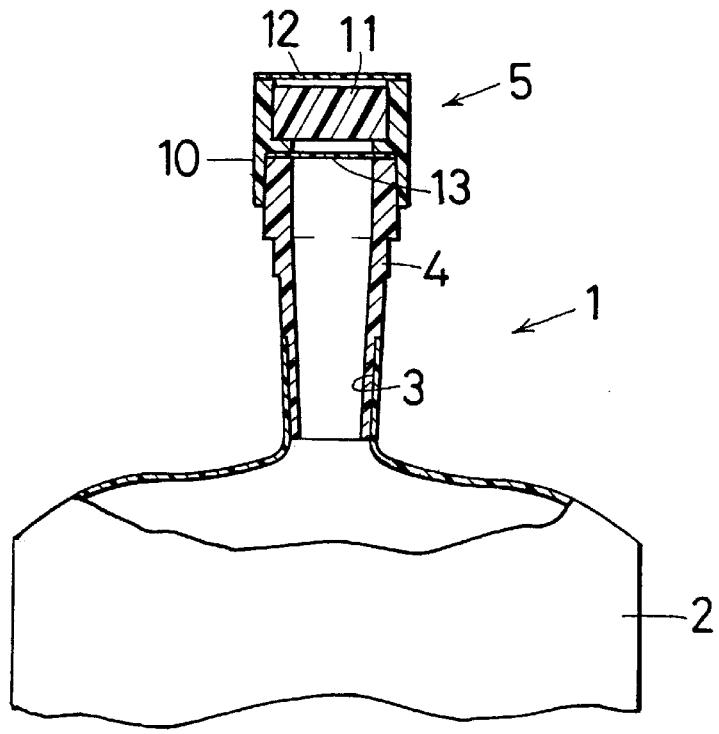
FIG. 1 is a sectional view of the pierceable stopper according to the present invention when it is applied to a medical liquid container for intravenous drip infusion.

First Embodiment:

FIG. 1 shows an example in which the pierceable stopper according to the present invention is applied to a medical liquid container for intravenous drip infusion. A medical liquid container 1 for intravenous drip infusion has a container body 2 made of a film-shaped transparent synthetic resin material, e.g. polyethylene. The container body 2 contains a medical liquid. The container body 2 has an opening 3 formed at the top thereof. One end of a tubular connecting pipe 4 is inserted into the opening 3. The opening 3 and the connecting pipe 4 are welded together by ultrasonic welding or the like. A pierceable stopper 5 is fitted and connected to the upper end of the connecting pipe 4. The connecting pipe 4 and the pierceable stopper 5 are also connected by ultrasonic or other welding method.

The pierceable stopper 5 comprises a stopper body 10, a pierceable part 11, an external hermetic sealing film 12, and an internal hermetic sealing film 13. The external hermetic sealing film 12 is a kind of partition for preventing the pierceable part 11 and the outside air from coming into direct contact with each other. The internal hermetic sealing film 13 is a partitioning member disposed to prevent the pierceable stopper 5 and the medical liquid in the container body 2 from coming into direct contact with each other and to maintain the airtightness of the container. The internal hermetic sealing film 13 and the container body 2 are joined together by using a publicly known technique, e.g. thermowelding using ultrasonic waves or bonding using an adhesive.

The pierceable part 11 and the stopper body 10, which constitute the pierceable stopper 5, are formed by using two different kinds of synthetic resin materials. The pierceable part 11 is provided inside the stopper body 10 by an injection molding method (described later). The pierceable part 11 is positioned in the central portion of the stopper body 10. The stopper body 10 and the pierceable part 11 are integrally molded by an insert dissimilar material injection molding process (described later).

The stopper body 10 is made of a thermoplastic synthetic resin material known as an engineering plastic material, e.g. polypropylene (PP), polyethylene (PE), ABS resin (ABS), polycarbonate (PC), or polyamide (PA). As a material for the pierceable part 11, various thermoplastic synthetic resin elastic materials can be used. Thermoplastic synthetic resin elastic materials usable in the present invention include nylon, polyurethane, olefin, polyester and styrene elastomers having a JIS(A) harness of 20 to 65 degrees, which is lower than the hardness of engineering plastics. One or more thermoplastic synthetic resin elastic materials are optionally selected from those mentioned above and used alone or in the form of a composite or mixed elastomer.

Even when the pierceable part 11 is pierced with a hollow needle, there will be no leakage from a crack, tear or cut opening which may be made in a pierced portion thereof. When the pierceable part 11 is pierced with a hollow needle, a tear or an opening is formed therein by the wedge action of the needle. After the formation of the tear or opening, the medical liquid in the container body 2 may leak out through the tear or the opening in a state where the needle is stuck into the pierceable part 11 or has been pulled out from it.

The reason for this is presumed as follows. Penetration of the needle into the pierceable part 11 causes permanent set, more precisely, permanent compression set, to be formed around the opening. Consequently, the pierceable part 11 cannot elastically recover from the deformation, or even if it recovers, the pierceable part 11 cannot ensure a sufficient elastic recovery force to close the opening. If the pierceable part 11 has a sufficient elastic recovery force, the tear or the opening can be closed by the elastic pressure. Therefore, there will be no leakage of the medical liquid from the container body 2.

Accordingly, it is necessary to impart physical properties to the pierceable part 11 so that there will be no leakage of the medical liquid. Such physical properties can be given by the following production process.

Figure 2:
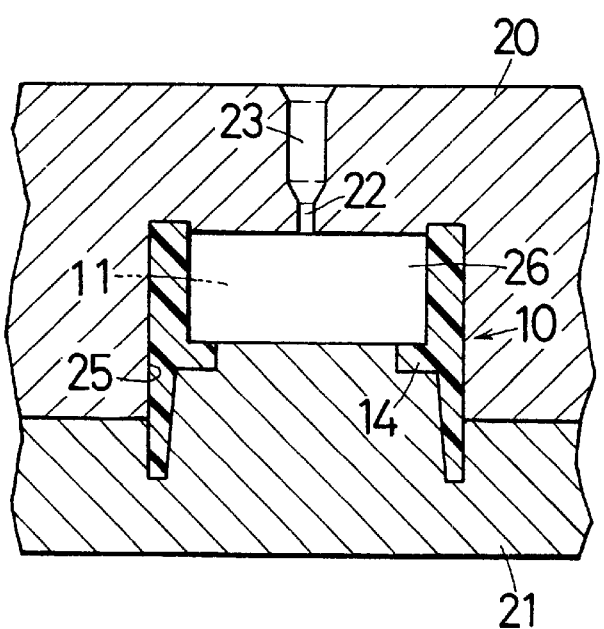
FIG. 2 is a sectional view showing a process for forming the pierceable stopper by injection molding process.

Method of Production by Injection Molding:

FIG. 2 shows a mold assembly used in the method of molding the pierceable stopper 5 according to the present invention. The mold assembly is formed from a stationary mold element 20 and a movable mold element 21. The stationary mold element 20 is provided with a gate 22 and a runner 23 communicating with the gate 22. When the stationary mold element 20 and the movable mold element 21 are in a closed position, a first cavity 25 is defined therebetween.

In the first cavity 25, a previously molded stopper body 10 is inserted. Accordingly, a second cavity 26 is defined between the stationary mold element 20, the movable mold element 21 and the stopper body 10. The second cavity 26 is a space for forming the pierceable part 11.

A melt of the above-described thermoplastic synthetic resin elastomer is injected into the second cavity 26. As the injection pressure of the resin melt, such a pressure is applied as causes a larger amount of volume reduction than the amount of volume reduction caused by the natural shrinkage of a melt, a semi-melt or a solid due to a temperature drop. More specifically, the resin melt is injected at a pressure higher than the normal injection pressure regarded as the optimum injection condition for the thermoplastic synthetic resin elastic material.

Preferably, the resin melt is injected at an injection pressure about 1.5 times higher than the normal injection pressure. More specifically, for a styrene elastomer or an olefin elastomer, it is desirable to apply an injection pressure of 500 kg/cm$^2$ or higher, more desirably 800 kg/cm$^2$ or higher. Consequently, the pierceable part 11 is confined in an internal space surrounded by the inner peripheral surface of the stopper body 10 and an annular projection 14 on the inner periphery of the lower portion of the stopper body 10. Accordingly, the pierceable part 11 is constantly compressed by the stopper body 10 at the outer periphery thereof and thus has an internal stress.

The stopper body 10 and the pierceable part 11 are thermowelded together in the injection mold by melting the surface of the thermoplastic synthetic resin material of the stopper body 10 with the melt heat of the molten thermoplastic synthetic resin elastic material for forming the pierceable part 11. When the pierceable part 11 is pierced with a hollow needle, even if this part is cut open, the opening is closed by an elastic recovery force derived from the compressive internal stress. Therefore, there is no possibility of leakage of the liquid from the container. In addition, the thermowelded portion prevents leakage of liquid even more effectively.

Second Embodiment:

According to the above-described first embodiment of the present invention, after the previously molded stopper body 10 has been inserted into the injection mold, the pierceable part 11 is injection-molded. In the second embodiment, the pierceable part 11 is molded previously, and after the previously molded pierceable part 11 has been inserted into an injection mold (not shown), a molten thermoplastic synthetic resin material for forming the stopper body 10 is injected to mold the stopper body 10.

The molten thermoplastic synthetic resin material forms the stopper body 10 while pressurizing the pierceable part 11 from the outer periphery thereof. In other words, the stopper body 10 is molded with the pierceable part 11 compressed therein. The injection pressure of the thermoplastic synthetic resin material may be substantially equal to the above-described injection molding pressure for the pierceable part 11. However, when the viscosity of the thermoplastic synthetic resin material is high, the injection molding pressure is set at a slightly higher level.

Meanwhile, the stopper body 10 and the pierceable part 11 are thermowelded together in the injection mold by melting the surface of the thermoplastic synthetic resin elastic material of the pierceable part 11 with the melt heat of the molten thermoplastic synthetic resin material for forming the stopper body 10. When the pierceable part 11 is pierced with a hollow needle, even if this part is cut open, the opening is closed by an elastic recovery force derived from the compressive internal stress. Therefore, there is no possibility of leakage of the liquid from the container. In addition, the thermowelded portion prevents leakage of liquid even more effectively.

Other Embodiments:

In the above-described embodiments, the pierceable stopper is formed by insert molding process. However, the molding process is not necessarily limited to the insert molding process. The pierceable stopper may also be formed by two-color injection molding process in which two resin materials are injected into the same injection mold. Containers to which the present invention is applicable are not necessarily limited to those of the type wherein the liquid in the container is taken out, but the present invention is also applicable to containers of the type wherein a solution is externally injected thereinto through a hollow needle.

EXAMPLES

Pierceable stoppers were molded according to the above-described embodiment under the following molding conditions using a styrene elastomer [RABALON (registered trademark) MJ4300C, hardness 45 (JIS-A), manufactured by Mitsubishi Chemical Corporation] to form the pierceable part 11.

Injection Molding Conditions:

Cylinder middle temperature: 200° C.

Resin temperature: 210° C.

Injection pressure: 450, 500, and 800 kg/cm$^2$

Injection time: 3 sec.

Mold temperature: 50° C.

Nozzle temperature: 190° C.

Table 1 below shows the results of a liquid leakage test carried out as an experimental example. In the test, each pierceable stopper was pierced with a plastic needle for intravenous drip infusion having a diameter of 4 millimeters, and left to stand for 30 minutes under ordinary temperature conditions. Then, the condition of leakage after the removal of the needle was visually judged. The diameter of the pierceable part was 14 millimeters. In Table 1, thickness is the height of the pierceable part. The material of the stopper body was polypropylene (PP).

TABLE 1

Liquid Leakage Test

| Material of stopper body | Thickness (mm) | Injection pressure (kgf/cm$^2$) | Test results (n = 3) |
| --- | --- | --- | --- |
| PP | 1 | 450 | x x x |
|  |  | 500 | Δ Δ Δ |
|  |  | 800 | ◉ Δ Δ |
|  | 3 | 450 | x x Δ |
|  |  | 500 | ◉ Δ Δ |
|  |  | 800 | ◉ ◉ ◉ |
|  | 6 | 450 | Δ Δ Δ |
|  |  | 500 | Δ ◉ Δ |
|  |  | 800 | ◉ ◉ ◉ |
|  | 8 | 450 | Δ Δ Δ |
|  |  | 500 | Δ ◉ ◉ |
|  |  | 800 | ◉ ◉ ◉ |
|  | 10 | 450 | ◉ ◉ Δ |
|  |  | 500 | ◉ ◉ ◉ |
|  |  | 800 | ◉ ◉ ◉ |
| None | 3 | 450 | x x x |
|  |  | 500 | x x x |
|  |  | 800 | x x x |
|  | 6 | 450 | x x x |
|  |  | 500 | x x x |
|  |  | 800 | x x x |

Notes:
◉ No leakage of liquid
Δ A little leakage of liquid
x Some leakage of liquid The results of a liquid leakage test regarding the hardness of the pierceable part will be shown below. As the material for the pierceable part, the following three different styrene elastomers were used: RABALON (registered trademark; Mitsubishi Chemical Corporation) MJ4300C, hardness 45 (JIS-A); MJ6300C, hardness 65 (JIS-A); and MJ8300C, hardness 85 (JIS-A). The other injection molding conditions were the same as the above.

TABLE 2

Liquid Leakage Test

| Hardness of pierceable part | Thickness (mm) | Injection pressure (kgf/cm$^2$) | Test results (n = 3) |
| --- | --- | --- | --- |
| MJ4300C 45 (JIS-A) | 3 | 500 | ◉ x x |
|  |  | 800 | ◉ ◉ ◉ |
|  | 6 | 500 | Δ ◉ Δ |
|  |  | 800 | ◉ ◉ ◉ |
| MJ6300C 65 (JIS-A) | 3 | 500 | ◉ Δ Δ |
|  |  | 800 | ◉ ◉ ◉ |
|  | 6 | 500 | ◉ ◉ Δ |
|  |  | 800 | ◉ ◉ ◉ |
| MJ8300C 85 (JIS-A) | 3 | 500 | x x x |
|  |  | 800 | x x x |
|  | 6 | 500 | x x x |
|  |  | 800 | x x x |

Notes:
◉ No leakage of liquid
Δ A little leakage of liquid
x Some leakage of liquid In the pierceable stopper according to the present invention, even if the pierceable part, which is pierceable with a hollow needle, is formed by using a thermoplastic synthetic resin elastomer inferior in elastic recovery force to rubber, there is no leakage of liquid from the container when the pierceable part is pierced with a hollow needle or after the needle has been pulled out.

It should be noted that the present invention is not necessarily limited to the foregoing embodiments but can be modified in a variety of ways without departing from the gist of the present invention.

What is claimed is:

1. A method of producing a pierceable stopper, said pierceable stopper having:

a pierceable part pierceable with a hollow needle, said pierceable part being made of a thermoplastic synthetic resin elastic material; and a stopper body made of a thermoplastic synthetic resin material having a higher rigidity than that of the material of said pierceable part, said stopper body having an outer peripheral portion for preventing a stress from propagating to an outside when said pierceable part is pierced with the hollow needle and for defining said pierceable part;

said method comprising the steps of:

injection-molding said pierceable part in an injection mold;

injecting a melt of a thermoplastic synthetic resin material into a cavity defined by said injection mold and said pierceable part to mold said stopper body at a melt injection pressure not lower than 500 kgf/cm$^2$; and thermowelding said stopper body to said pierceable part in said injection mold by the melt heat of either said thermoplastic synthetic resin material or said thermoplastic synthetic resin elastic material.

2. A method according to claim 1, wherein an injection pressure of said melt is not lower than 500 kg/cm$^2$.

3. A method according to claim 1, wherein the injection pressure of said melt during said injecting step is not lower than 800 kgf/cm$^2$.

4. A method according to claim 3, wherein said stopper body is made of a thermoplastic synthetic resin material, and said stopper body and said pierceable part are thermowelded together in said injection mold by melt heat of said thermoplastic synthetic resin material or said thermoplastic synthetic resin elastic material.

* * * * *